US008122015B2

(12) United States Patent
Liu et al.

(10) Patent No.: US 8,122,015 B2
(45) Date of Patent: Feb. 21, 2012

(54) MULTI-RANKER FOR SEARCH

(75) Inventors: Tie-Yan Liu, Beijing (CN); Qin Tao, Beijing (CN); Hang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 192 days.

(21) Appl. No.: 11/859,066

(22) Filed: Sep. 21, 2007

(65) Prior Publication Data

US 2009/0083248 A1    Mar. 26, 2009

(51) Int. Cl.
*G06F 7/00*    (2006.01)
*G06F 17/30*    (2006.01)

(52) U.S. Cl. ........................................................ 707/723

(58) Field of Classification Search .................. 707/3, 5, 707/723
See application file for complete search history.

(56) References Cited

U.S. PATENT DOCUMENTS

| | | | |
|---|---|---|---|
| 5,835,905 A * | 11/1998 | Pirolli et al. ........................ | 707/3 |
| 5,864,846 A | 1/1999 | Voorhees et al. | |
| 6,795,820 B2 | 9/2004 | Barnett | |
| 2002/0073126 A1* | 6/2002 | Kim .............................. | 708/207 |
| 2002/0194161 A1 | 12/2002 | McNamee et al. | |
| 2003/0046277 A1* | 3/2003 | Jackson et al. ...................... | 707/3 |
| 2004/0249831 A1 | 12/2004 | Fagin et al. | |
| 2005/0154686 A1 | 7/2005 | Corston et al. | |
| 2005/0262050 A1 | 11/2005 | Fagin et al. | |
| 2006/0095430 A1 | 5/2006 | Zeng et al. | |
| 2006/0195440 A1 | 8/2006 | Burges et al. | |
| 2006/0287980 A1 | 12/2006 | Liu et al. | |
| 2007/0011121 A1* | 1/2007 | Bi et al. .......................... | 706/20 |
| 2007/0106659 A1 | 5/2007 | Lu et al. | |

OTHER PUBLICATIONS

Thorsten Joachims. "Optimizing Search Engines Using Clickthrough Data." © 2002 ACM.*
Velldal et al. "Statistical Ranking in Tactical Generation." © 2006 Assoc. for Computational Linguistics.*
Byvatov et al. "Comparison of Support Vector Machine and Artificial Neural Network Systems for Drug/Nondrug Classification." © 2003 American Chemical Society. Published Sep. 27, 2003.*
Cao, et al., "Adapting Ranking SVM to Document Retrieval", available at least as early as Jun. 5, 2007, at <<http://delivery.acm.org/10.1145/1150000/1148205/p186-cao.pdf?key1=1148205&key2=8576201811&coll=GUIDE&dl=GUIDE&CFID=24656543&CFTOKEN=17035637>>, ACM, 2006, pp. 186-193.

* cited by examiner

*Primary Examiner* — Charles Lu
(74) *Attorney, Agent, or Firm* — Lee & Hayes, PLLC

(57) ABSTRACT

Systems and methods for processing user queries and identifying a set of documents relevant to the user query from a database using multi ranker search are described. In one implementation, the retrieved documents can be paired to form document pairs, or instance pairs, in a variety of combinations. Such instance pairs may have a rank order between them as they all have different ranks. A classifier, hyperplane, and a base ranker may be constructed for identifying the rank order relationships between the two instances in an instance pair. The base ranker may be generated for each rank pair. The systems use a divide and conquer strategy for learning to rank the instance pairs by employing multiple hyperplanes and aggregate the base rankers to form an ensemble of base rankers. Such an ensemble of base rankers can be used to rank the documents or instances.

12 Claims, 6 Drawing Sheets

Fig. 4

MULTI-RANKER FOR SEARCH

BACKGROUND

Information retrieval (IR) and IR systems provide access to books, journals, and other documents, and websites (web pages) on the world wide web. Examples of IR systems include Microsoft® Live Search and Google® Search. The IR systems may also be implemented in smaller networks or on personal computers, for example, many universities and public libraries that provide access to books, journals, and other documents. The IR systems typically have two main tasks, that is, to find relevant documents related to a user query and to rank these documents according to their relevance to the user query.

In IR and related fields, learning to rank methods have gained increased attention for better presentation of the retrieved information. In a generic learning to rank method, machine learning techniques are used to rank documents according to their relevance to the query. In machine learning technique, ranking is performed by means of classification of instance or document pairs. Each document pair consists of two documents from two different ranks. Therefore, for each document pairs, there is an order between the two documents. A classification is performed for identifying the order relationship between the two documents in any document pair. The ranking of documents can be then conducted based on the classification model. However, such ranking methods are not sufficient to rank order relationships. Accordingly, there remains a need to improve ranking methods for information retrieval technology.

SUMMARY

This summary is provided to introduce concepts relating to learning to rank documents in information retrieval, which are further described below in the detailed description. This summary is not intended to identify essential features of the claimed subject matter, nor is it intended for use in determining the scope of the claimed subject matter.

Techniques for learning to rank documents in information retrieval are described. In one implementation, instance pairs are created from a set of documents, subsets of the instance pairs are generated corresponding to rank pairs; base rankers are constructed for each rank pair. Ordering relationships may be identified between instances in the instance pairs; and ranks are aggregated by creating a list of base rankers.

BRIEF DESCRIPTION OF THE DRAWINGS

The detailed description is described with reference to the accompanying figures. In the figures, the left most digit(s) of a reference number identifies the figure in which the reference number first appears. The same numbers are used throughout the drawings to reference like features and components.

DETAILED DESCRIPTION

This disclosure is directed to techniques for learning to rank documents in information retrieval (IR) systems. Learning to rank technique may involve creation of one or more ranking models, where each rank model can be targeted at a rank pair. The learning to rank technique employs a divide and conquer strategy for ranking the documents. The technique involves classification of various documents into document pairs or instance pairs. Each instance pair includes two documents having two different ranks. The instance pairs may be created by pairing the documents in variety of combinations. Such instance pairs may have a rank order between them such as that the instant pairs have different ranks.

A classifier, hyperplane, and a base ranker may be constructed for identifying the rank order relationships between the two instances of an instance pair. The base ranker is a hyperplane that may be generated for each rank pair. Therefore, each rank pair may have a corresponding base ranker. The base rankers in combination may be called Multi-Hyperplane Ranker. Each base ranker may be trained with a Ranking Support Vector Machine (RSVM) for ranking instances in a rank pair.

The ranking SVM is a learning to rank method for ranking documents. The above method involves: 1) selecting a linear ranking model 2) using the linear ranking model to assign scores to each documents 3) sorting documents in the descending order of the scores; and 4) ranking the documents based on the scores. However, as mentioned previously, the present learning to rank technique employs multiple linear ranking models i.e. multiple base rankers targeted at different rank pairs. Each base ranker may be a single hyperplane trained with ranking SVM for ranking documents from one rank pair thereby increasing the accuracy of ranking. Finally, a rank aggregation may be performed by generating an ensemble of base rankers.

The techniques described herein may be used in many different operating environments and systems. Multiple and varied implementations are described below. An exemplary environment that is suitable for practicing various implementations is discussed in the following section.

Network Environment

Figure 1:
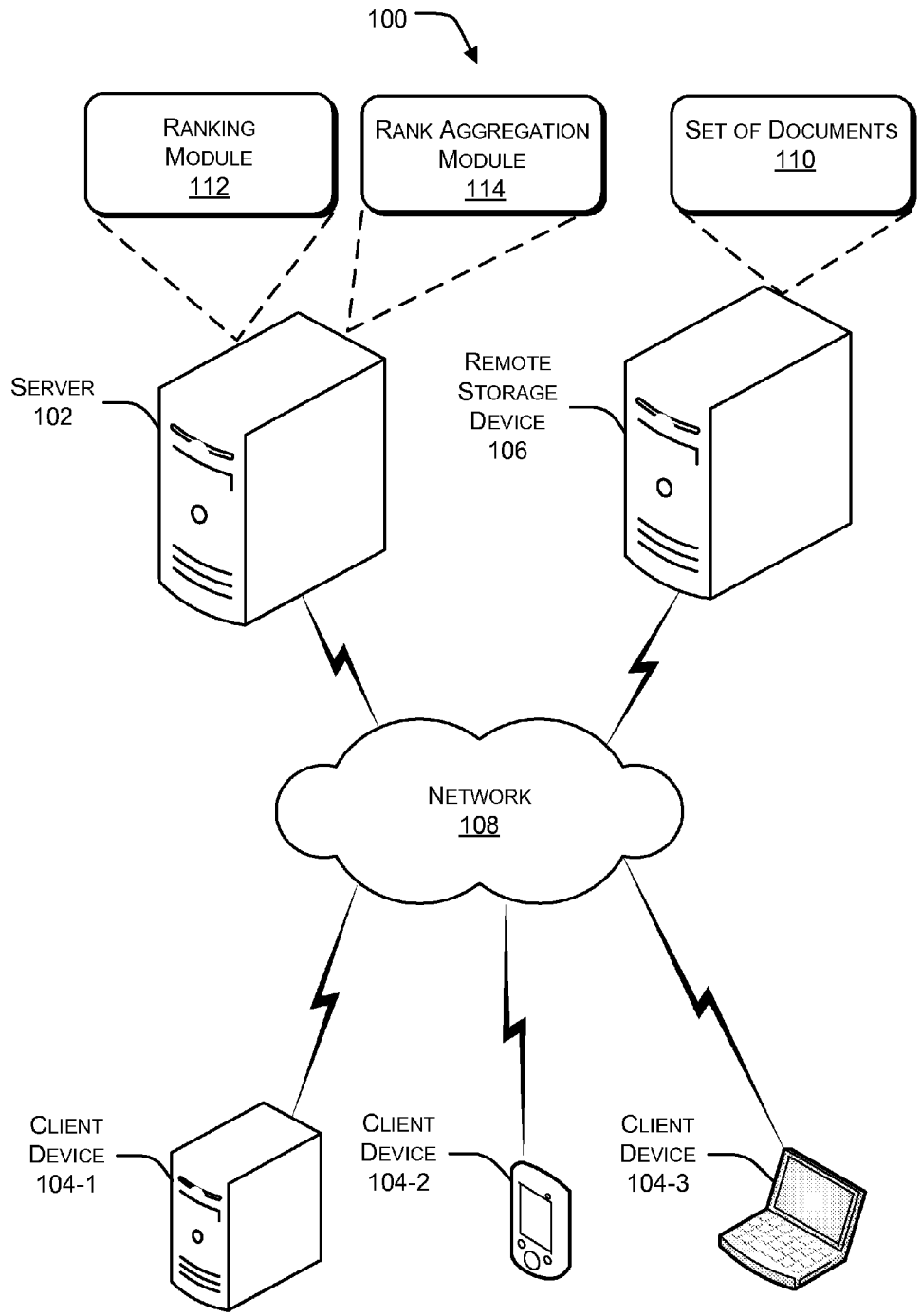
FIG. 1 illustrates an exemplary network for implementing a method for learning to rank documents in document retrieval.

FIG. 1 illustrates an exemplary network architecture 100 in which the ranking of documents is implemented to facilitate client access to a server over a network. The network architecture 100 includes a server system 102 connected to client devices 104-1, 104-2, 104-3, and 104-N (collectively referred to as client devices or devices 104) and a remote storage device 106 over a network 108. The server 102 may be configured to receive one or more queries regarding specific documents from the client devices 104. The server 102 may be implemented in several ways, for example, a general purpose computing device, multiple networked servers (arranged in clusters or as a server farm), a mainframe, and so forth. The client devices 104 are equipped with I/O devices to receive queries for documents from respective users. The client devices 104 are representative of many different types of input devices, such as a general purpose computer a server, a laptop, and/or a mobile computing device. Examples of network 108 include, but are not limited to, local area network (LAN), wide area network (WAN). The network 108 may also be a wireless network, a wired network, or a combination thereof.

Each client device 104 may send queries for document retrieval to the server 102. The server 102 compares the queries with a set of documents 110 to identify a set of documents relevant to the queries. The identified documents may be ranked based on their relevance to the queries. For example, the identified documents may be categorized into three categories: definitely relevant, partially relevant, and irrelevant, and having respective ranks 1, 2, and 3 assigned to them. It may be noted that the identified documents may be sorted into any number of categories having corresponding ranks. In one implementation, the documents may be stored in a database that may be a part of the remote storage device 106.

Consider an example where a user wants a document related to a subject matter of his/her choice. The user submits a query through an input device integrated into, or connected to, one of the client devices 104. The query may be, for example, a keyword or any other parameter related to the subject matter. The server 102 examines the query and compares the query with the database of information or documents present in the remote storage device 106. It may be noted that in another implementation, the query can be compared with the database of documents stored in the server 102.

The server 102 implements a ranking module 112 to segregate the set of documents relevant to the query into various subsets of document pairs or instance pairs. An instance pair includes two instances or documents having two different ranks or belonging to a rank pair. The instance pairs related to a rank pair may be included in a single subset. For example, the instance pairs (a, b) and (c, d) may belong to a single rank pair, namely (s, t). Thus, the instance pairs (a, b) and (c, d) can be included in a single subset SS1.

The instances in the instance pairs may have an order relationship between themselves, i.e., the instances may be arranged in a particular order based on their ranks. The ranking module 112 employs a classification model namely "Multiple Hyperplane Ranker" for ranking the instances. The classification model includes two components namely, base rankers and rank aggregation. Thus the ranking module 112 generates a base ranker, i.e. a linear ranking model for each rank pair. In one implementation, each base ranker may be generated from the instance pairs of each subset for the corresponding rank pair. Thus, if there are K ranks, then number of base rankers generated for K(K−1)/2 rank pairs, or K ranks, may be K(K−1)/2. For example, for K equals to 4, the number of rankers that may be created is 6.

The base rankers rank the instances of the subsets and generate ranking lists. Subsequently, a rank aggregation module 114 implements an aggregation methodology to generate an ensemble of base rankers and a ranking list. According to the above methodology, the rank aggregation module 114 assigns scores to each instance based on their position in the ranking lists. The score of an instance may denote the number of instances that may be ranked lower than the instance in all the ranking lists. The instances may be arranged according to their scores. In one implementation, the rank aggregation module 114 may also assign weights to the base rankers in addition to assigning of scores to the base rankers. The weights denote the degree of importance of the base rankers that may reflect the user's prior knowledge. The rank aggregation module 114 provides a set of documents to the user based on the list of scored instances.

Exemplary System

Figure 2:
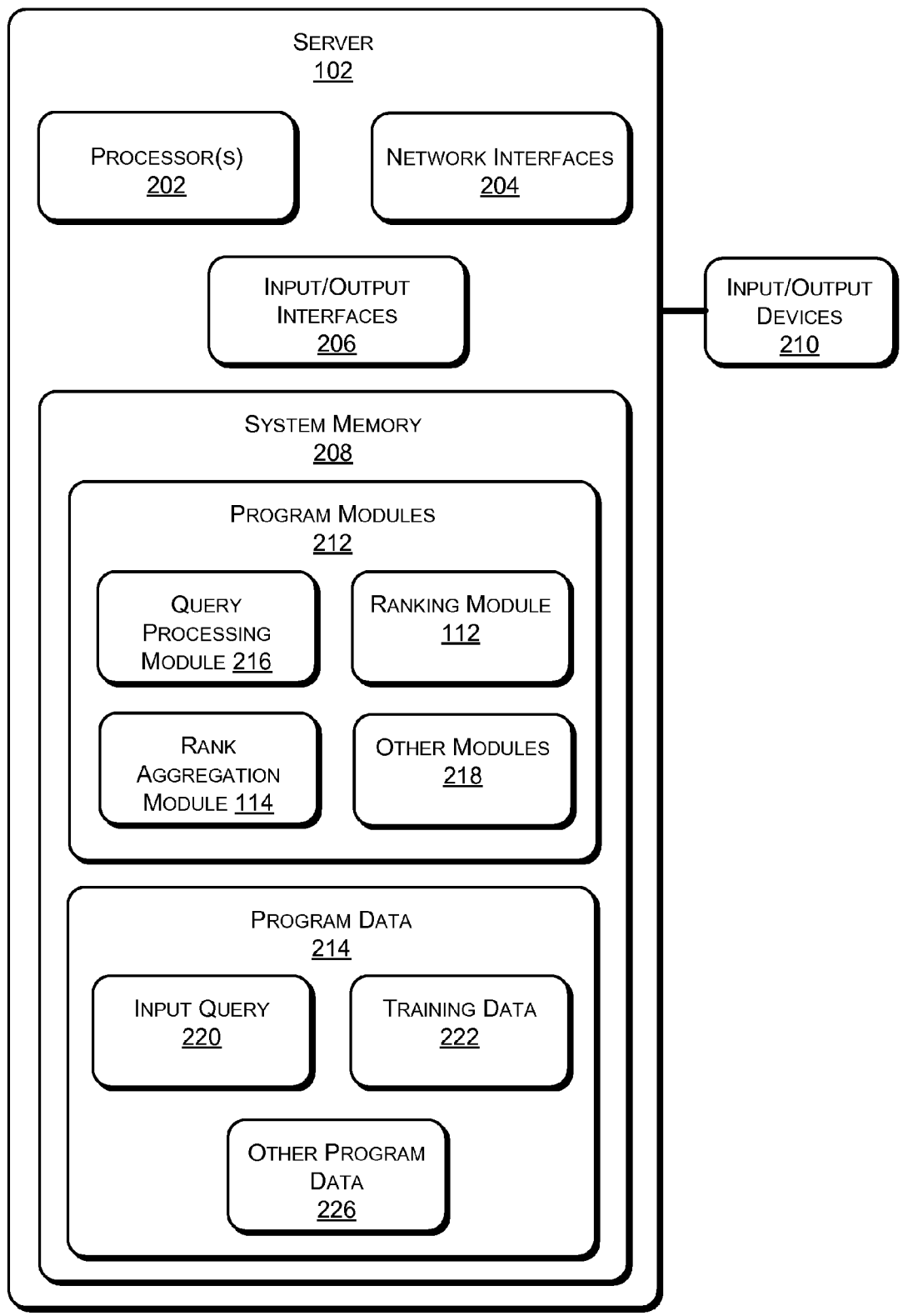
FIG. 2 illustrates a block diagram with selected components in an exemplary system implementing a method for learning to rank documents during information retrieval.

FIG. 2 shows an exemplary server or server system 102 that may be used for ranking documents. The system 102 may be, for example, a general purpose computing device, a server, a laptop, a mobile computing device, and/or so on. The system 102 includes one or more processor(s) 202, network interfaces 204, input/output interfaces 206, and a system memory 208. The processor(s) 202 may be one or more microprocessors, microcomputers, microcontrollers, dual core processors, and so forth. The network interfaces 204 provide connectivity to a wide variety of networks and protocol types, including wire networks (e.g., LAN, cable, etc.) and wireless networks (e.g., WLAN, cellular, satellite, etc.).

Input/output interfaces 206 provide data input and output capabilities for the system 102. The input/output interfaces 206 may include, for example, a mouse port, a keyboard port, etc. In the illustrated example, the system 102 receives user queries for document retrieval through input/output interfaces 206. Several input/output devices 210 may be employed to receive input queries for documents from users. Examples of the input/output devices 210 can include a mouse, a keyboard, etc.

The system memory 208 includes, for example, volatile random access memory (e.g., RAM) and non-volatile read-only memory (e.g., ROM, flash memory, etc.). The system memory 208 is used to store one or more program modules 212 and program data 214. The program modules 212 generally include routines, programs, objects, components, data structures, etc., that perform particular tasks or implement particular abstract data types. In the illustrated implementation, the program modules 212 include, for example, a query processing module 216, the ranking module 112, the rank aggregation module 114, and other modules 218, for example, an operating system to provide a runtime environment, networked communications between multiple users, and so forth.

As discussed above, the system 102 may be employed to rank documents for information retrieval. The query processing module 216 processes a user query received through the input/output interfaces 206 to identify documents relevant to the user query. The query processing module 216 identifies the documents by comparing the parameters gathered from the user query with a database of documents (e.g., database of documents 110). As mentioned previously, the database of documents 110 may be located in the system 102 or in the remote storage device 106.

The query processing module 216 sends the set of documents to the ranking module 112. The ranking module 112 performs an initial ranking on the set of documents based on their relevancy to the user query. In such an operation, the ranking module 112 may group the set of documents into various groups. The groups may be "definitely relevant," "partially relevant," and "irrelevant." Each group may be assigned a rank. For example, rank 1, 2, or 3 according to their relevancy. It may be noted that the documents may be classified into any number of groups.

In one implementation, the query processing module 216 may group the set of documents into several groups. Subsequently, the query processing module 216 sends these groups of documents to the ranking module 112 for further ranking. The ranking module 112 identifies document pairs belonging to a rank pair and creates a subset of document pairs associated to a rank pair. The ranking module 112 repeats this process until separate subsets of document pairs are generated for each rank pair.

The ranking module 112 generates a base ranker from the document pairs in each subset. Thus, a base ranker may be created for each rank pair. As the base rankers are created for each subset, the number of instance pairs for each base ranker is less and, thereby, space complexity and time complexity for training the base ranker may be less. The base rankers may be trained separately or in parallel with the process of creating base rankers.

In one implementation, the ranking module 112 may create the base rankers for a rank pair (s, t) using:

$$\min_{\omega_{s,t}, \xi_{i,j,s,t}} \frac{1}{2}\|\omega_{s,t}\|^2 + C\sum_{i,j} \xi_{i,j,s,t} \quad (1)$$

$$s.t. \langle \omega_{s,t}, x_i^{(s)} - x_j^{(t)} \rangle \geq 1 - \xi_{i,j,s,t}$$

$$\xi_{i,j,s,t} \geq 0$$

In the above equations (1), $x_i^{(s)}$ is an instance $x_i$ with rank s.

The ranking module 112 may generate a base ranker for each rank pair. Therefore, if there are K ranks, then there are K(K−1)/2 base rankers for K(K−1)/2 rank pairs. For example, if K is 4 then the base rankers may be represented by $\{\omega_{1,2}, \omega_{1,3}, \omega_{1,4}, \omega_{2,3}, \omega_{2,4}, \omega_{3,4}\}$ corresponding to rank pairs $\{(1, 2), (1, 3), (1, 4), (2, 3), (2, 4), (3, 4)\}$.

In another implementation, the ranking module 112 creates base rankers for adjacent rank pairs. For example, the base rankers may be generated for rank pairs $\{(1, 2), (2, 3), (3, 4)\}$.

The base rankers thus generated may identify the ordering relationship between instances of each instance pair in all the subsets. An instance pair can be a rank pair of a particular instance. Subsequently, the base rankers rank the instance pairs and generate ranking lists. The ranking module 112 then sends the ranking lists and the subsets of instance pairs to the rank aggregation module 114. The rank aggregation module 114 assigns a score to each instance of the instance pairs based on their position in the ranking lists. As mentioned previously, the score of an instance may denote the number of instances that may be ranked lower than the instance in all the ranking lists. The rank aggregation module 114 submits a list of documents to the user, based on the scores assigned to the instances. The manner in which the rank aggregation module 114 operates is explained in detail under "Exemplary Rank Aggregation Module".

Figure 3:
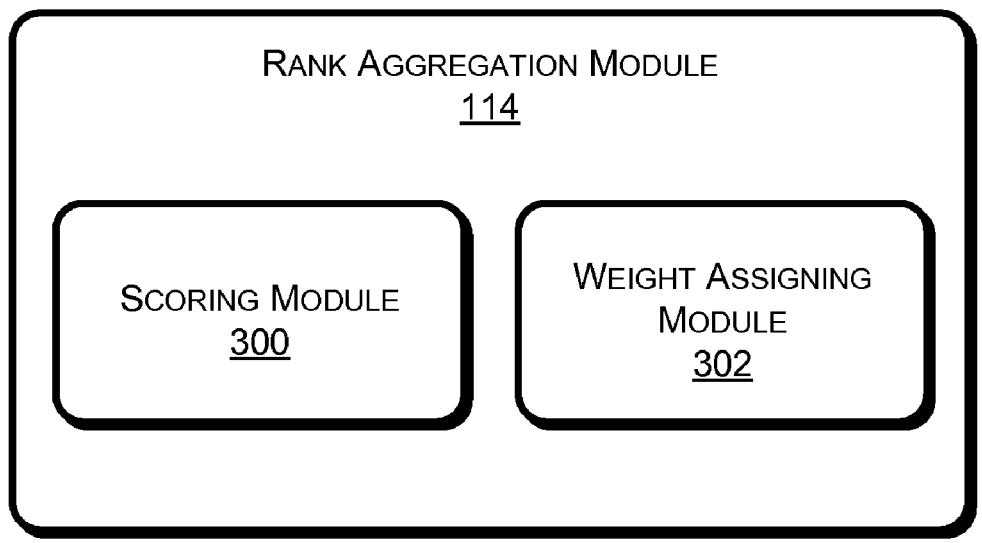
FIG. 3 illustrates a block diagram of an exemplary rank aggregation module that is configured to aggregate the ranks of retrieved documents.

FIG. 3 illustrates an exemplary rank aggregation module 114. The rank aggregation module 114 includes a scoring module 300 and a weight assigning module 302. The rank aggregation module 114 processes the ranking lists, i.e., the subsets of instance pairs received from the ranking module 112. The rank aggregation module 114 employs the scoring module 300 to perform aggregation on the subsets of instance pairs. In one implementation, aggregation can be performed by a methodology called BordaCount. BordaCount is a well known methodology to persons of skill in the art.

According to the BordaCount methodology, the scoring module 300 assigns a score to each instance based on its position in the ranking lists. The score of an instance x denotes the number of instances that may be ranked lower than the instance in the ranking lists. The score of the instance x may be expressed by the following equation:

$$s(x) = \sum_{k=1}^{l} s_k(x) \quad (2)$$

In the above equation (2), $s_k(x) = \#\{y|x >_{\tau_k} y, y \in D\}$, and $x >_{\tau_k} y$ means that the instance x is ranked higher that instance y in the ranking list $\tau_k$. Further, D denotes a set of instances to be ranked, n denotes the number of instances in D, $\tau_1, \ldots, \tau_l$ denote ranking lists on D, and l denotes the number of base rankers.

The scoring module 300 then sorts the instances according to the scores of the instances. The rank aggregation module 114 provides a list of instances or documents to the user based on the scores assigned.

In one implementation, the rank aggregation module 114 implements the weight assigning module 302 for assigning weights to the base rankers. The weights denote a degree of relevancy of the documents with respect to the user query. In such a case, the score s(x) of the instance x may be defined by the following equation:

$$s(x) = \sum_{k=1}^{l} \alpha_k s_k(x) \quad (3)$$

In the above equation (3), $\alpha_k$ denotes the weight assigned to the base ranker. The weights may be tuned using a separate validation set. In one implementation, the user based on user's prior knowledge can assign the weights manually.

Thereafter, the rank aggregation module 114 analyzes the scores of the instances and arranges the documents or instances according to the scores to form a list of documents. The list of documents is then provided to the user.

Exemplary Methods

Exemplary processes for learning to rank documents using multiple hyperplanes are described with reference to FIGS. 1-3. These processes may be described in the general context of computer executable instructions. Generally, computer executable instructions can include routines, programs, objects, components, data structures, procedures, modules, functions, and the like that perform particular functions or implement particular abstract data types. The processes may also be practiced in a distributed computing environment where functions are performed by remote processing devices that are linked through a communications network. In a distributed computing environment, computer executable instructions may be located in both local and remote computer storage media, including memory storage devices.

Figure 4:
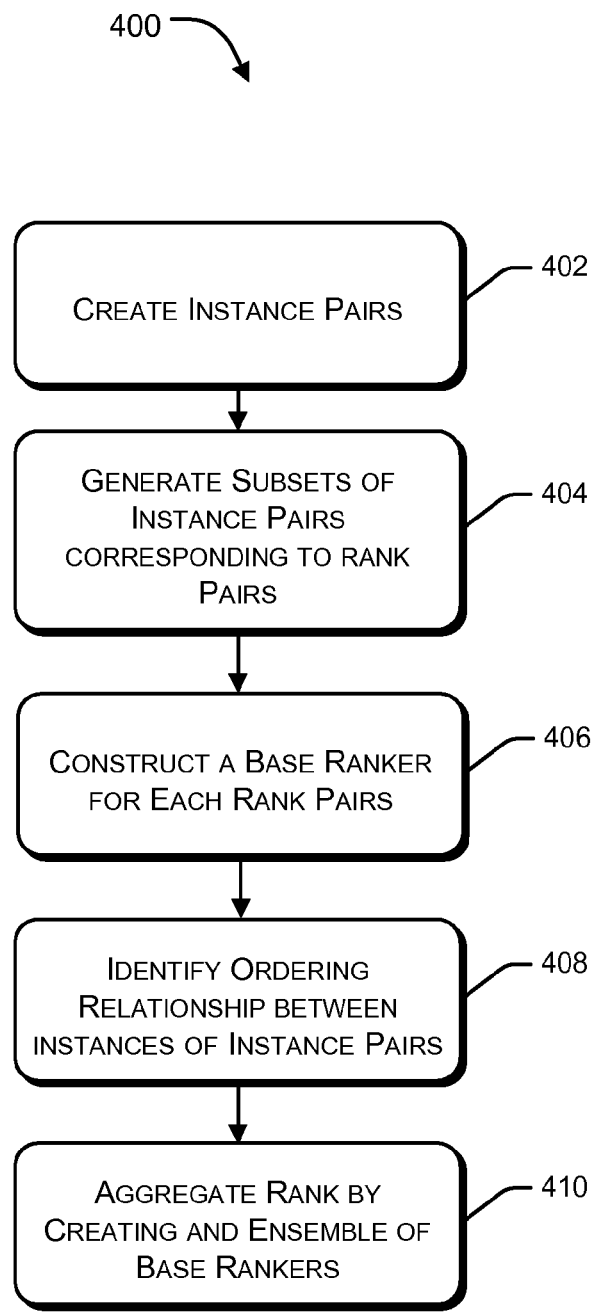
FIG. 4 illustrates an exemplary technique of creating base rankers for each rank pair.

FIG. 4 illustrates an exemplary process 400 for ranking the documents using multiple base rankers and subsequently aggregating the ranks assigned by the base rankers. The process 400 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. The order in which the process is described is not intended to be construed as a limitation, and any number of the described blocks can be combined in any order to implement the process, or an alternate process. Additionally, individual blocks may be deleted from the process without departing from the spirit and scope of the subject matter described herein. For discussion purposes, the process 400 is described with reference to the implementations of FIGS. 1-3.

At block 402, the instance pairs are created from a set of documents. The server 102 gathers the set of documents relevant to the input query 220 from the database of documents (e.g., database of documents 110). As mentioned previously, the set of documents include documents having ranks assigned based on their degree of relevancy to the input query 220. The degree of relevancy may be determined by analyzing a vector of features of the documents. The vector of features may include, for example, term frequency, inverse document frequency, document length, or any of their combinations.

For example, the ranking module 112 ranks a document from the set of documents based on the vector of features, such as a term frequency or number of times a term is included in the document. In such a case, the term may be the input query 220 or may one of the parameters of the input query 220. The server 102 generates instance pairs from the set of documents. The instance pairs includes documents having different ranks.

At block 404, subsets of instance pairs corresponding to rank pairs are generated. The instance pairs may be grouped into several subsets of instance pairs. Each subset of instance pairs may correspond to a rank pair. For example, instance pairs (a, b) and (c, d) may belong to a single rank pair namely, (s, t). Thus, the instance pairs (a, b) and (c, d) can be included in a single subset SS1.

At block 406, a base ranker for each rank pair is constructed. The instances of a subset are collected to construct a base ranker for the corresponding rank pair. Thus, this methodology may be implemented in all the subsets to construct the base rankers.

For example, the ranking module 112 selects a subset of instance pairs pertaining to a rank pair and generates a base ranker. Similarly, base rankers may be constructed for other subsets. In one implementation, the ranking module 112 can construct base rankers for subsets related to adjacent rank pairs. For example, if subsets SS1, SS2, and SS3 pertains to rank pairs (1,2), (1,3), and (2,3), respectively, the base rankers may be constructed for SS1 and SS3 having adjacent rank pairs, i.e., (1,2) and (2,3)

At block 408, the ordering relationship between instances in instance pairs are identified. A base ranker identifies the order relationship between instances in various instance pairs belonging to a particular subset. Subsequently, the base rankers generate a ranking list from the subsets. For example, a base ranker for a rank pair (s,t) can be employed to identify instance pairs such as (p,q), (r,v), and (x,y). In such a case, the base ranker may identify the order relationship between instances ranked s, namely, p, r, and x and instances ranked t, namely, q, v, and y, and/or instances arranged in any other possible combinations.

At block 410, the ranks are aggregated by creating an ensemble (list) of base rankers. The base rankers of all the subsets are collected to form the ensemble. It may be noted that the ensemble of base rankers may be created by any known method. The method may be performed in supervised or unsupervised fashion. In the above methodology, the ranking list may be examined to assign scores to each instance based on their position in the ranking list. Subsequently, the instance or document having the highest score may be displayed as primary document to the user.

In one implementation, weights are assigned to base rankers so as to give importance to instances belonging to subsets having these base rankers. The weights are determined based on prior knowledge of the user and can be applied manually. Thus, the scores are assigned to the instances or documents.

Figure 5:
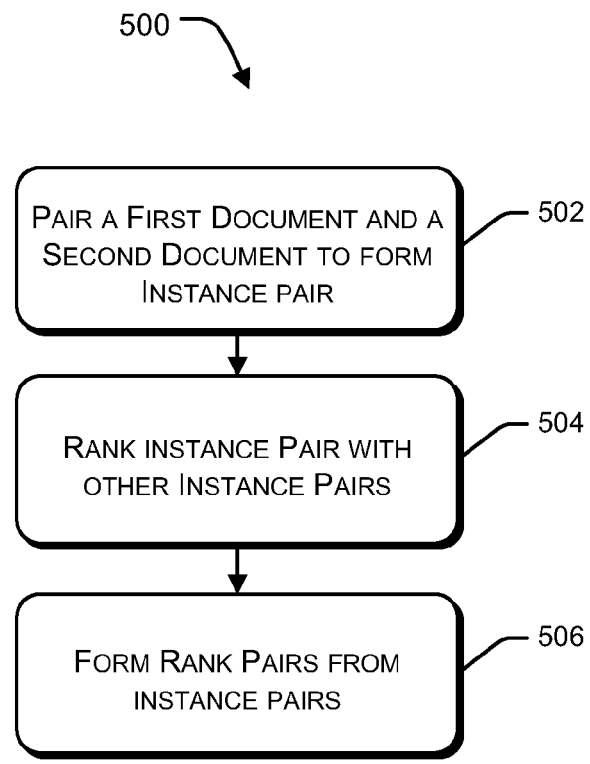
FIG. 5 illustrates an exemplary technique of learning to rank documents during information retrieval.

FIG. 5 illustrates an exemplary method 500 for creating base rankers for each rank pairs described with reference to FIGS. 1-4. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 502, a first document and a second document can be combined to form an instance pair. A set of documents include documents having different ranks. The first document and the second document possessing different ranks may be identified from the set of documents to form the instance pair. Such instance pairs may be created until all the documents in the set of documents are selected and paired.

For example, the ranking module 112 collects the first document $D_1$ and second document $D_2$ from a set of documents to form the instance pair $I_1$ belonging to a rank pair $R_1$. The rank pair $R_1$ may include two different ranks namely, s and t. It may be noted that several other documents may be paired to form instance pairs belonging to the rank pair $R_1$.

At block 504, subset of instance pairs belonging to a rank pair is created. The instance pairs belonging to a rank pair may be grouped to form a subset of instance pairs. Similar subsets associated with other rank pairs may be created by grouping their respective instance pairs.

At block 506, a base ranker is generated from a subset of instance pairs. The subset of instance pair pertaining to a rank pair may be selected and a base ranker can be created from the instance pairs. In this implementation, the base rankers may be created for all rank pairs. Thus, a base ranker can focus on ranking with respect to a rank pair. In another implementation, the base rankers may be generated for adjacent rank pairs thus reducing the number of base rankers.

Exemplary Computing Device

Figure 6:
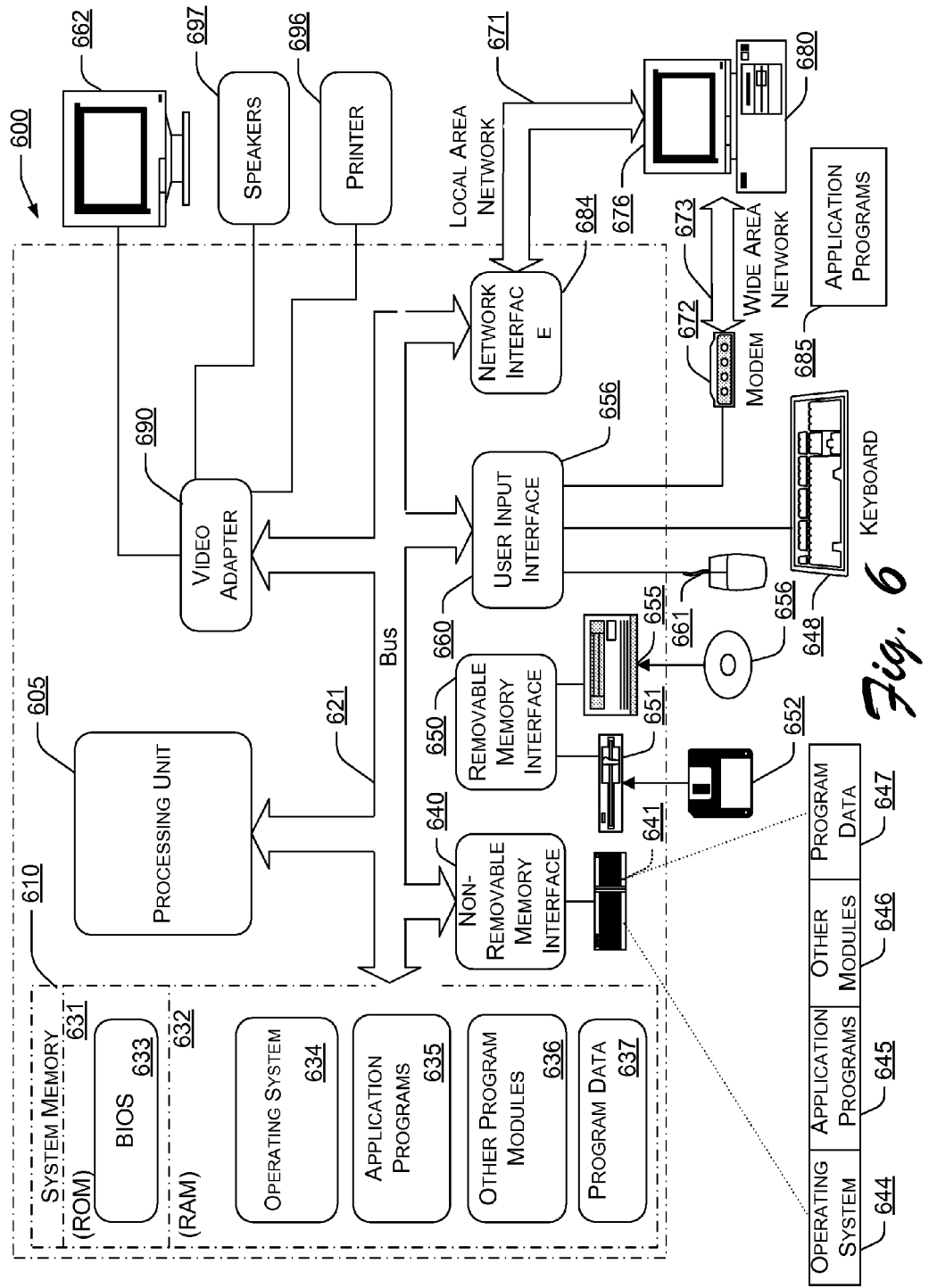
FIG. 6 is an illustration of an exemplary computing device.

FIG. 6 shows an exemplary computing device or computer 600 suitable as an environment for practicing aspects of the subject matter. In particular, the computer 600 may be a detailed implementation of the server 102 and/or the client devices 104 described above with reference to FIG. 1. The Computer 600 provides a suitable environment for practicing various aspects of the subject matter. The components of the computer 600 may include, but are not limited to a processing unit 605, a system memory 610, and a system bus 621 that couples various system components, including the system memory 610, to the processing unit 605.

The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as the Mezzanine bus.

The exemplary computer 600 typically includes a variety of computer-readable media. The computer-readable media can be any available media, which is accessible to the computer 600. By way of example, and not limitation, the computing device-readable media may comprise computer storage media and communication media. Moreover, the computer storage media includes volatile and nonvolatile, removable and non-removable media implemented in any method or technology for storage of information such as computer-readable instructions, data structures, program modules, or other data. Some of the storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computer 600.

By way of example, and not limitation, the communication media includes wired media such as a wired network or direct-wired connection and wireless media such as acoustic, RF, infrared and other wireless media. Combinations of any of the above should also be included within the scope of computing device readable media.

The system memory 610 includes the computing device storage media in the form of volatile and/or nonvolatile memory such as read only memory (ROM) 631 and random access memory (RAM) 632. The ROM 631 stores a basic input/output system 633 (BIOS), which contains the basic routines that help to transfer information between elements within computer 600, such as during start-up. The RAM 632 typically contains data and/or program modules that are immediately accessible to and/or presently being operated on by the processing unit 605. By way of example, and not limitation, FIG. 6 illustrates an operating system 634, application programs 635, other program modules 636, and program data 637.

The computer 600 may include other removable/non-removable, volatile/nonvolatile computer storage media. By way of example only, FIG. 6 illustrates a hard disk drive 641 that is a read-write, non-removable, nonvolatile magnetic media, a magnetic disk drive 651 that can read-write from a removable, nonvolatile magnetic disk 652, and an optical disk drive 655 that can read-write from a removable, nonvolatile optical disk 656, such as a CD ROM. Other removable/non-removable, volatile/nonvolatile computing device storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface, for example, an interface 640, and the magnetic disk drive 651 and the optical disk drive 655 are typically connected to the system bus 621 by a removable memory interface, for example, an interface 650.

The drives and their associated computing device storage media discussed above, and illustrated in FIG. 6, provide storage area for computer-readable instructions, data structures, program modules, and other data of the computer 600. In FIG. 6, for example, the hard disk drive 641 is illustrated as storing an operating system 644, application programs 645, other program modules 646, and program data 647. Note that these components can either be the same as or different from the operating system 634, the application programs 635, the other program modules 636, and the program data 637. The operating system 644, the application programs 645, the other program modules 646, and the program data 647 are given different numbers here to illustrate that, at a minimum, they are different copies.

A user may enter commands and information into the exemplary computer 600 through input devices such as a keyboard 648 and pointing device 661, commonly referred to as a mouse, trackball, or touch pad. Other input devices (not shown) may include a microphone, joystick, game pad, satellite dish, scanner, or the like. These and other input devices are often connected to the processing unit 620 through a user input interface 660 that is coupled to the system bus 621, but may be connected by other interface and bus structures, such as a parallel port, game port, or in particular a USB port.

A monitor 662 or other type of display device is also connected to the system bus 621 via an interface, such as a video interface 690. In addition to the monitor 662, computing devices may also include other peripheral output devices such as speakers 697 and a printer 696, which may be connected through an output peripheral interface 695.

The exemplary computer 600 may operate in a networked environment using logical connections to one or more remote computing devices, such as a remote computing device 680. The remote computing device 680 may be a personal computing device, a server, a router, a network PC, a peer device or other common network node, and typically includes many or all of the elements described above relative to the computer 600. The logical connections depicted in FIG. 6 include a local area network (LAN) 671 and a wide area network (WAN) 673. Such networking environments are commonplace in offices, enterprise-wide computing device networks, intranets, and the Internet.

When used in a LAN networking environment, the exemplary computer 600 is connected to the LAN 671 through a network interface or an adapter 670. When used in a WAN networking environment, the exemplary computer 600 typically includes a modem 672 or other means for establishing communications over the WAN 673, such as the Internet. The modem 672, which may be internal or external, may be connected to the system bus 621 via the user input interface 660, or via other appropriate mechanism. In a networked environment, the program modules depicted relative to the exemplary computer 600, or portions thereof may be stored in a remote memory storage device, which are described above in detail. By way of example, and not limitation, FIG. 6 illustrates remote application programs 685. It will be appreciated that the network connections shown are exemplary and other means of establishing a communications link between the computing devices may be used.

CONCLUSION

Although embodiments of a system for ranking documents using multiple hyperplane rankers have been described in language specific to structural features and/or methods, it is to be understood that the subject of the appended claims is not necessarily limited to the specific features or methods described. Rather, the specific features and methods are disclosed as exemplary implementations a system for ranking documents using multiple hyperplane rankers.

What is claimed is:

1. A method comprising:
   processing, using a processor, a user query received to identify a set of documents relevant to a user query by comparing the parameters gathered from the user query with a database of documents;
   receiving, using the processor, the set of documents for ranking,
   performing, using the processor, an initial ranking on the received documents, each of the documents assigned an initial ranking from a set of rankings,
   creating, using the processor, a plurality of document pairs from the received documents based on a vector of features that includes a frequency of a term in each document of the set of documents and a length of each document of the set of documents, each document pair including two documents having two different ranks, each rank pair comprising two different ranks of different integer values,
   generating, using the processor, at least two subsets of the plurality of document pairs, each subset corresponding to a different rank pair, each rank pair comprising two ranks of different ranking values corresponding to respective different ranks;
   generating, using the processor, multiple hyperplanes comprising multiple base rankers for each rank pair, wherein each base ranker of the multiple base rankers is a single hyperplane including a linear ranking model trained for a particular rank pair using a ranking support vector machine that ranks the documents in each subset, wherein the generating creates a base ranker for each rank pair; and ranking, using the processor, the document pairs within each of the at least two subsets using the base ranker associated with each rank pair; and aggregating, using the processor, the multiple hyperplanes into an ensemble of base rankers comprising the base rankers for each rank pair, and producing, from the ensemble of base rankers, a ranking list that ranks the documents in the set of documents; and creating, using the processor, base rankers only for adjacent rank pairs, each adjacent rank pair comprised of rankings of integer values that directly follow one another in sequence.

2. The method of claim 1, wherein the set of documents includes documents ranked based on relevancy.

3. The method of claim 2, further comprising, prior to the creating, ranking the documents based on a vector of features.

4. The method of claim 1, wherein the aggregating includes examining the ranking list produced from the ensemble of the base rankers to assign scores in each instance based on a position on the ranking list.

5. The method of claim 1 further comprising assigning weights to the base rankers in the ensemble of the base rankers, wherein the weights give importance to instances belonging to subsets corresponding to particular base rankers.

6. The method of claim 1 performed for searching on the World Wide Web.

7. A computer-readable storage medium storing instructions that, when executed by a processor, perform operations comprising:

processing a user query received to identify a set of documents relevant to a user query by comparing the parameters gathered from the user query with a database of documents;

receiving the set of documents for ranking, performing an initial ranking on the received documents, each of the documents assigned an initial ranking from a set of rankings, creating a plurality of document pairs from the received documents based on a vector of features that includes a frequency of a term in each document of the set of documents and a length of each document of the set of documents, each document pair including two documents having two different ranks, each rank pair comprising two different ranks of different integer values, generating at least two subsets of the plurality of document pairs, each subset corresponding to a different rank pair, each rank pair comprising two ranks of different ranking values corresponding to respective different ranks;

generating multiple hyperplanes comprising multiple base rankers for each rank pair, wherein each base ranker of the multiple base rankers is a single hyperplane including a linear ranking model trained for a particular rank pair using a ranking support vector machine that ranks the documents in each subset, wherein the generating creates a base ranker for each rank pair; and ranking the document pairs within each of the at least two subsets using the base ranker associated with each rank pair; and aggregating the multiple hyperplanes into an ensemble of base rankers comprising the base rankers for each rank pair, and producing, from the ensemble of base rankers, a ranking list that ranks the documents in the set of documents; and creating base rankers only for adjacent rank pairs, each adjacent rank pair comprised of rankings of integer values that directly follow one another in sequence.

8. The computer-readable storage medium of claim 7, wherein the creating a plurality of document pairs is performed for all documents in a set of documents, until all the documents in the set are selected and paired.

9. The computer-readable storage medium of claim 7, further including associating similar subsets with other rank pairs by grouping a document pair with other document pairs.

10. A system comprising:

a processor;

a memory connected to the processor, the memory comprising modules including:

a query processing module executable on the processor, configured to process a user query received to identify a set of documents relevant to a user query by comparing the parameters gathered from the user query with a database of documents;

a ranking module executable on the processor, configured to perform the following acts:

receive the set of documents for ranking, perform an initial ranking on the received documents, each of the documents assigned an initial ranking from a set of rankings, create a plurality of document pairs from the received documents based on a vector of features that includes a frequency of a term in each document of the set of documents and a length of each document of the set of documents, each document pair including two documents having two different ranks, each rank pair comprising two different ranks of different integer values, generating at least two subsets of the plurality of document pairs, each subset corresponding to a different rank pair, each rank pair comprising two ranks of different ranking values corresponding to respective different ranks;

generate multiple hyperplanes comprising multiple base rankers for each rank pair, wherein each base ranker of the multiple base rankers is a single hyperplane including a linear ranking model trained for a particular rank pair using a ranking support vector machine that ranks the documents in each subset, wherein the generating creates a base ranker for each rank pair; and rank the document pairs within each of the at least two subsets using the base ranker associated with each rank pair; and a rank aggregation module executable on the processor, configured to aggregate the multiple hyperplanes into an ensemble of base rankers comprising the base rankers for each rank pair, and further configured to produce, from the ensemble of base rankers, a ranking list that ranks the documents in the set of documents; and wherein the ranking module is further executable on the processor to create base rankers only for adjacent rank pairs, each adjacent rank pair comprised of rankings of integer values that directly follow one another in sequence.

11. The system of claim 10, wherein the query processing module further groups the documents into several groups.

12. The system of claim 10, wherein the rank aggregation module includes a scoring module executable on the processor to aggregate the subsets of the document pairs.

* * * * *